(12) United States Patent
Mueck et al.

(10) Patent No.: US 9,554,416 B2
(45) Date of Patent: Jan. 24, 2017

(54) SHARED SPECTRUM REASSIGNMENT IN A SPECTRUM SHARING CONTEXT

(71) Applicants: Markus Dominik Mueck, Unterhaching (DE); Reza Arefi, Great Falls, VA (US); Srikathyayani Srikanteswara, Portland, OR (US)

(72) Inventors: Markus Dominik Mueck, Unterhaching (DE); Reza Arefi, Great Falls, VA (US); Srikathyayani Srikanteswara, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 169 days.

(21) Appl. No.: 14/128,093

(22) PCT Filed: Sep. 27, 2013

(86) PCT No.: PCT/US2013/062455
§ 371 (c)(1),
(2) Date: Dec. 20, 2013

(87) PCT Pub. No.: WO2014/175919
PCT Pub. Date: Oct. 30, 2014

(65) Prior Publication Data
US 2014/0321425 A1    Oct. 30, 2014

Related U.S. Application Data

(60) Provisional application No. 61/816,662, filed on Apr. 26, 2013.

(51) Int. Cl.
*H04W 76/06* (2009.01)
*H04W 36/00* (2009.01)
*H04W 36/14* (2009.01)

(52) U.S. Cl.
CPC .......... *H04W 76/066* (2013.01); *H04W 36/00* (2013.01); *H04W 36/0055* (2013.01); *H04W 36/14* (2013.01)

(58) Field of Classification Search
CPC .......... H04W 76/066; H04W 36/0055; H04W 36/0083; H04W 36/08
See application file for complete search history.

(56) References Cited

U.S. PATENT DOCUMENTS 8,112,094 B1    2/2012  Wellington
8,175,603 B1 *  5/2012  Hoole ................... H04W 36/38
                                                    370/328

(Continued)

FOREIGN PATENT DOCUMENTS

JP      2012-199899 A     10/2012
KR   10-2011-0081721 A     7/2011

(Continued)

OTHER PUBLICATIONS

International Search Report with Written Opinion received for PCT Patent Application No. PCT/US2013/062455, mailed on Jan. 16, 2014, 10 pages.

*Primary Examiner* — Redentor Pasia
*Assistant Examiner* — Peter Mak
(74) *Attorney, Agent, or Firm* — Stoel Rives LLP (57) ABSTRACT

The techniques introduced here provide for efficient mass handover from a shared-spectrum wireless communication system (e.g., Licensed Shared Access, Authorized Shared Access, Cloud Spectrum Services, or the like) to a target system (e.g., 3GPP LTE, or the like). The techniques further provide for efficient handling of transitions from one shared-spectrum allocation period to the next shared-spectrum allocation period. Additionally, the techniques provide for (Continued)

efficient handling of multi-operator transitions to re-licensed or re-negotiated shared-spectrum allocations.

24 Claims, 10 Drawing Sheets

(56) References Cited

U.S. PATENT DOCUMENTS

| | | |
|---|---|---|
| 2006/0166677 A1 | 7/2006 | Derakshan et al. |
| 2010/0124930 A1* | 5/2010 | Andrews et al. ............. 455/436 |
| 2012/0264440 A1* | 10/2012 | Koskela .............. H04W 72/042 455/450 |
| 2014/0011509 A1* | 1/2014 | Markwart ........... H04W 72/082 455/452.1 |
| 2014/0162666 A1* | 6/2014 | Ratasuk ............ H04W 72/0486 455/450 |
| 2015/0018002 A1* | 1/2015 | Touag .................. H04W 16/14 455/454 |
| 2015/0230098 A1* | 8/2015 | Li ......................... H04W 16/10 455/454 |

FOREIGN PATENT DOCUMENTS

| | | |
|---|---|---|
| WO | 2011/141931 A2 | 11/2011 |
| WO | WO 2014000818 A1 * | 1/2014 |
| WO | WO 2014043854 A1 * | 3/2014 |

* cited by examiner

SHARED SPECTRUM REASSIGNMENT IN A SPECTRUM SHARING CONTEXT

RELATED APPLICATIONS

This application claims priority benefit of U.S. Provisional Patent Application No. 61/816,662, filed Apr. 26, 2013 which is hereby incorporated by reference herein in its entirety.

TECHNICAL FIELD

The present application relates to shared-spectrum networks and more particularly to release and/or reassignment of spectrum at the end of a licensed period.

BACKGROUND ART

Shared-spectrum licensing introduces a mechanism that enables operators of wireless communication networks to temporarily increase or decrease bandwidth according to need. Indeed, it is expected that not enough dedicated spectrum will be available for the operators of cellular communication networks in the future. The temporary increase or decrease of bandwidth may be had by licensing a portion of shared-spectrum bandwidth on a short-term or long-term basis. One objective for developing shared-spectrum licensing systems is to provide for the increased spectrum needs of some operators by providing the operators of cellular communication networks with access to additional licensed spectrum from other entities (e.g., public safety, government, other private licensees, etc.).

DESCRIPTION OF THE EMBODIMENTS

References in this specification to "an embodiment," "one embodiment," or the like, mean that the particular feature, structure or characteristic being described is included in at least one embodiment of the present invention. Occurrences of such phrases in this specification do not necessarily all refer to the same embodiment.

Various shared-spectrum licensing systems have been proposed and are being developed. One example of a shared-spectrum system is the Licensed Shared Access (LSA) concept which is being developed by Radio Spectrum Policy Group (RSPG) on a European level. LSA is based on a similar solution introduced by Qualcomm and NOKIA which is called Authorized Shared Access (ASA). ASA, however, is limited to International Mobile Telecommunication (IMT) spectrum while LSA also addresses non-IMT spectrum. Both solutions exist on a rather conceptual level for the time being. A related technology which is called Cloud Spectrum Services (CSS) addresses the same framework as LSA and ASA, but introduces implementation solutions in greater detail. Additionally, CSS more explicitly addresses dynamic sharing of shared-spectrum resources than either LSA or ASA.

On a regulatory level, particularly in Europe, there is significant interest in shared-spectrum solutions such as LSA, ASA, and CSS. For example, The European Conference of Postal and Telecommunications Administration (CEPT) Working Group Frequency Management (WGFM) agreed to launch corresponding project teams in September of 2012. The European Telecommunications Standards Institute (ETSI) has also agreed on the set-up of a System Reference Document (SRDoc), which is the official way for ETSI to cooperate with regulatory bodies. This document will allow industry to officially provide inputs and requirements related to CEPT work on LSA/ASA/CSS. This SRDoc targets in particular the 2.3-2.4 GHz Band which is expected to be one of the most straightforward candidates for shared-spectrum usage. Additional candidates for shared-spectrum usage may include, for example, 3.8 GHz and 470-790 MHz in Europe and 3.5 GHz in the US.

The 2.3-2.4 GHz band is currently licensed to various entities throughout Europe, which would be considered the incumbent spectrum holders. For example, one use of the spectrum is by cordless camera networks for police and broadcasters, SAB/SAP video links, electronic news gathering (ENG), PMSE devices, amateur radio systems, and the like.

It is anticipated that various systems are candidate licensees of the shared-spectrum bands. For example, most cellular wide area radio communication technology (which may include e.g., a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g., UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS- TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), or the like.

Figure 1:
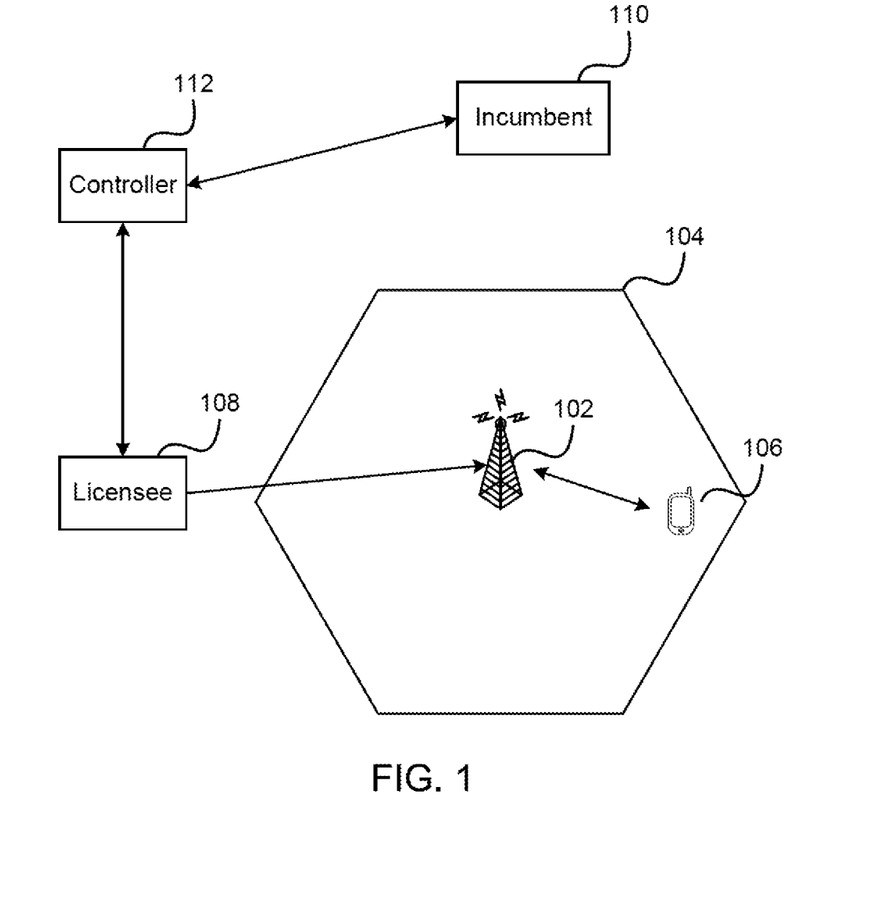
FIG. 1 shows an example architecture of a shared-spectrum system.

FIG. 1 shows an example architecture of a shared-spectrum system. The system includes a shared-spectrum base station 102 covering area 104. The shared-spectrum base station provides network access to mobile device 106 within the coverage area 104. The shared-spectrum base station is controlled by a network operator that is a licensee 108 in the shared-spectrum system. The licensee 108 receives access to the shared-spectrum from an incumbent spectrum holder 110 through a central controller or broker 112. The controller 112 may be responsible for the allocation and/or re-allocation of spectrum through a negotiation process.

Figure 2:
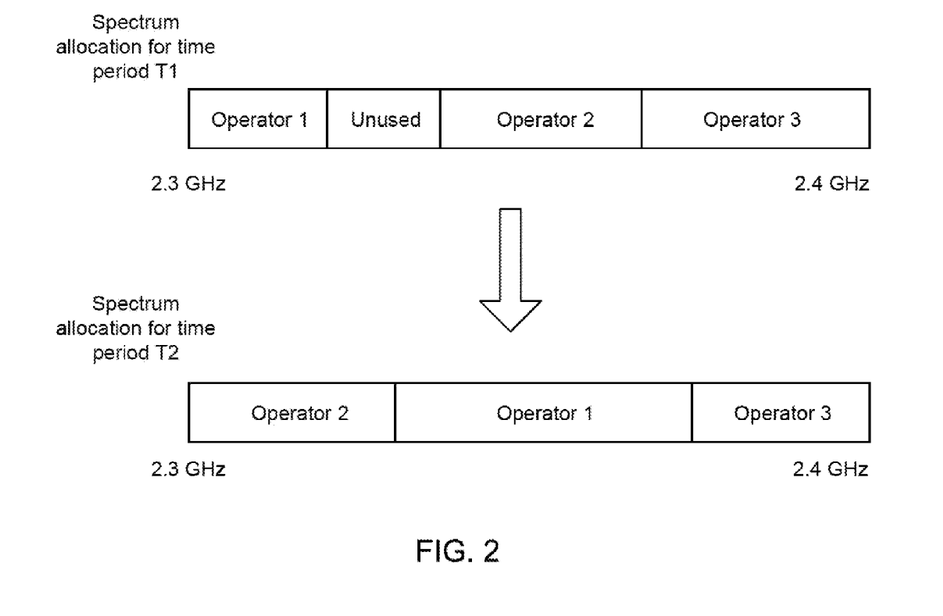
FIG. 2 illustrates re-allocation of spectrum in a shared-spectrum system.

In various embodiments, the spectrum allocated to the licensee 108 under the shared-spectrum agreement may be allocated based on varying timescales, ranging from static up to a highly dynamic allocation of the shared-spectrum. In many cases, after the expiration of an allocation period, spectrum will be re-assigned to cellular operators. FIG. 2 provides an illustration of spectrum re-allocation. Since LSA currently contemplates a candidate band in the 2.3-2.4 GHz band, the figure below uses parameters tailored to this band. However, the same approaches may apply to any other bands using LSA or any other suitable spectrum sharing technique (e.g., ASA, CSS, etc.). FIG. 2 illustrates a first time period, T1, where Operator 1, Operator 2, and Operator 3 use spectrum in the shared-spectrum band. In a second time period, T2, Operator 1, Operator 2, and Operator 3 still use spectrum in the shared-spectrum band, however the spectrum has been re-allocated. In various embodiments, the spectrum allocation time periods T1 and T2 may immediately follow each other or there may be a waiting period in between, in which parts (or all) if the concerned spectrum is not used by cellular operators. For sake of simplicity and clarity, the spectrum allocation time periods, T1 and T2, above are assumed to be identical for all concerned cellular operators and all concerned bands. In practice, those spectrum allocation time periods may vary for the operators and/or the concerned fractions of the band.

Regardless of whether the allocation time periods are short or long, a smooth transition from one allocation to the next would be desirable. Current documents on shared-spectrum systems do not include any intelligent management of the transition between spectrum allocation time periods. Consequently, it can be assumed that the legacy solutions rely on an interruption of service once the time period for a spectrum allocation expires. The service is re-initiated once the new spectrum allocation is renegotiated and re-assigned. A drawback on the user side is that the connection drops and after an interruption period, the service may need to be re-established.

Therefore, an intelligent management of the transition between spectrum allocation time periods is needed. The techniques introduced here provide for continued mobile wireless service in the event that a spectrum allocation time period expires.

In some embodiments, all users operating in the shared-spectrum bands can be re-allocated to a suitable target system, such as a licensed-band system (e.g., 3GPP LTE or legacy 2G or 3G systems), WiFi spectrum in the 2.4 GHz and/or 5 GHz bands, or the like, as soon as the spectrum allocation time period for the concerned cellular operator and/or the concerned spectrum bands expires. One issue that arises in this scenario relates to the fact that a large number of mobile device may typically be operating in the concerned shared-spectrum bands and the instantaneous handover of a large number of users (possibly 1,000 users or more in a macro cell) may be difficult to achieve and might lead to system outage for a large number of users.

Figure 3:
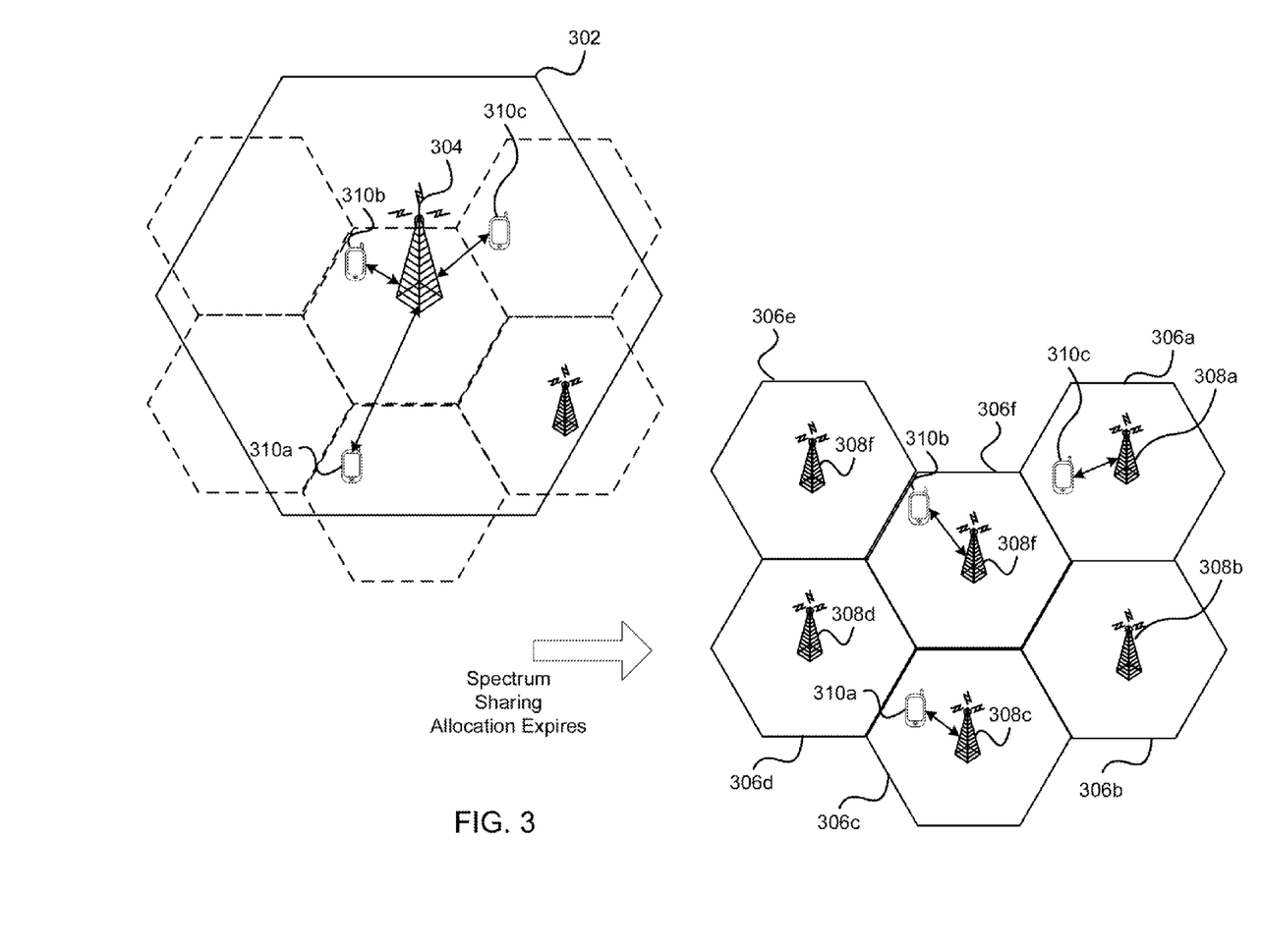
FIG. 3 illustrates handover from a shared-spectrum base station having a carrier of relative low frequency to one or more target base stations.

It should be noted that shared-spectrum bands may be available at various carrier frequencies, thus affecting the number of mobile devices for handover to a target base station. FIG. 3 illustrates handover from a shared-spectrum base station having a carrier of relative low frequency to one or more target base stations. For relative low frequency shared-spectrum bands (i.e., frequencies lower than those of a target band), assuming a similar level of base station transmit power, the coverage area 302 of a shared-spectrum base station 304 may be larger compared to the coverage area 306a, 306b, 306c, 306d, 306e, and 306f of a target base station 308a, 308b, 308c, 308d, 308e, and 308f (e.g., a 3GPP LTE, 3G, 2G or other type of base station, access point, etc.) due to the favorable propagation characteristics at low frequencies.

For example, the TV band (470-790 MHz, in Europe) may be a possible candidate for spectrum sharing in the future. In this case, the mobile devices 310a, 310b, and 310c within the coverage area of shared-spectrum base station 304 may be within the coverage areas of multiple target base stations (e.g., base stations 308a, 308c, and 308f) operating at a higher carrier frequency. Thus, the handover from the shared spectrum base station may be distributed to a number of target base stations. This could lead to additional overhead, and potential service interruption, for the underlying target system in determining the best base station choices for the potentially large number of mobile devices added almost simultaneously.

Figure 4:
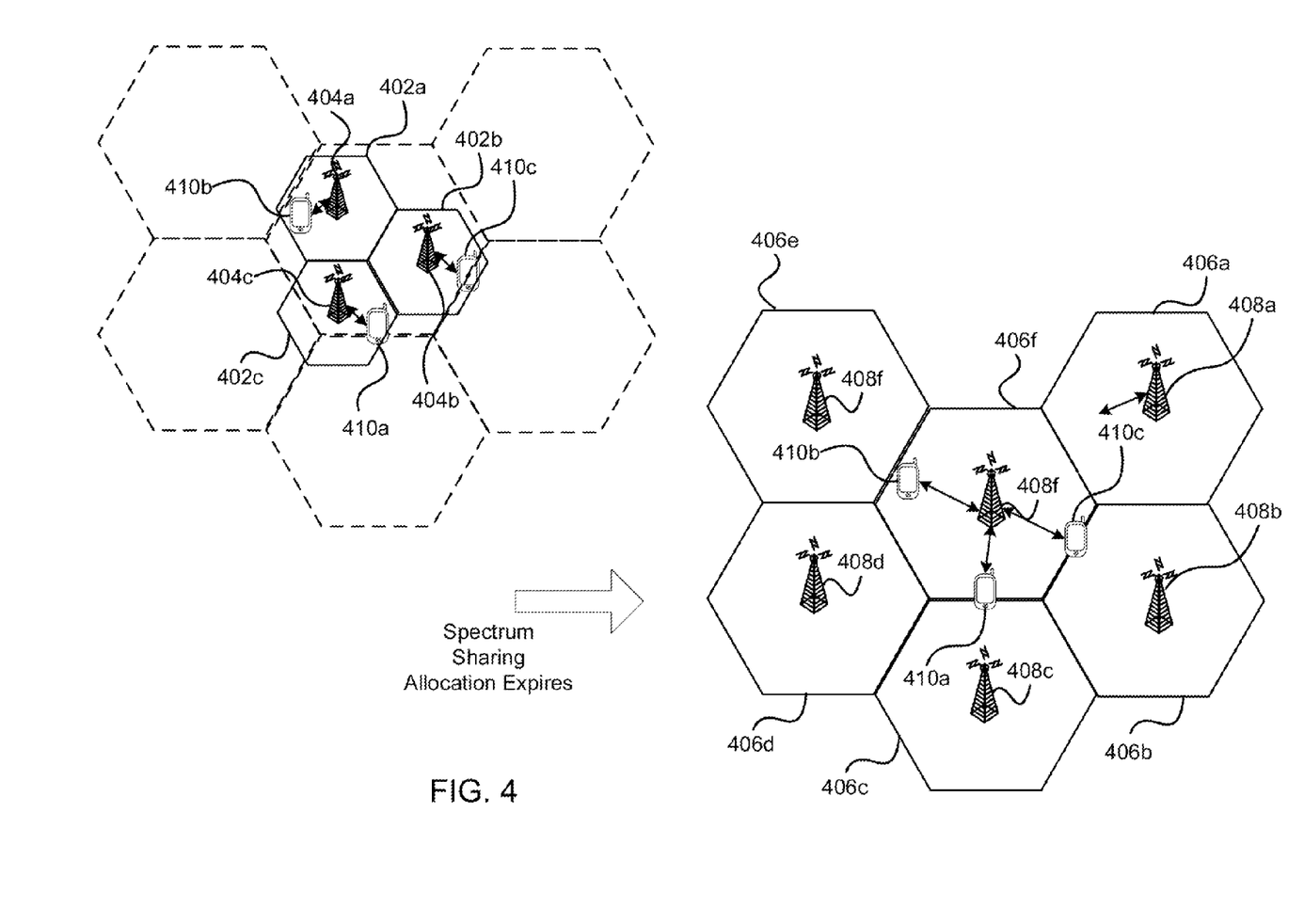
FIG. 4 illustrates handover from a shared-spectrum base station having a carrier of relative high frequency to one or more target base stations.

FIG. 4 illustrates handover from a shared-spectrum base station having a carrier of relative high frequency to one or more target base stations. For high frequency shared spectrum bands (e.g., 3.5 GHz band), assuming the same level of base station transmission power, the coverage area 402a, 402b, and 402c of a shared spectrum base station 404a, 404b, and 404c may be smaller compared to the coverage area 406a, 406b, 406c, 406d, 406e, and 406f of a target system 408a, 408b, 408c, 408d, 408e, and 408f due to the less favorable propagation characteristics at high frequencies. Expiration of a shared-spectrum allocation in this scenario may lead to an instantaneous and significant increase in traffic load on a single target base station (e.g., base station 408f) in the underlying target system.

For shared-spectrum base stations having carrier frequencies which are similar to target base stations (e.g., in some embodiments, a single base station may comprise the target band and shared-spectrum technology), it can be assumed that i) the mobile devices allocated to a shared-spectrum base station may perform a handover to a single target base station in the case that their deployments overlap or ii) the mobile devices allocated to the shared-spectrum base station may perform a handover to two or more target base stations in the case that their deployments do not overlap. This could lead to an instantaneous and significant increase in traffic load on a single target base station in the underlying target system (case i) or to additional overhead for the underlying target system in determining the best target base station for the potentially large number of mobile devices added almost simultaneously (case ii).

Additionally, the coverage areas of shared-spectrum base stations and target base stations may be limited by regulation and therefore contribute to the same affects as those described above with regard to varying transmission frequencies.

Figure 5:
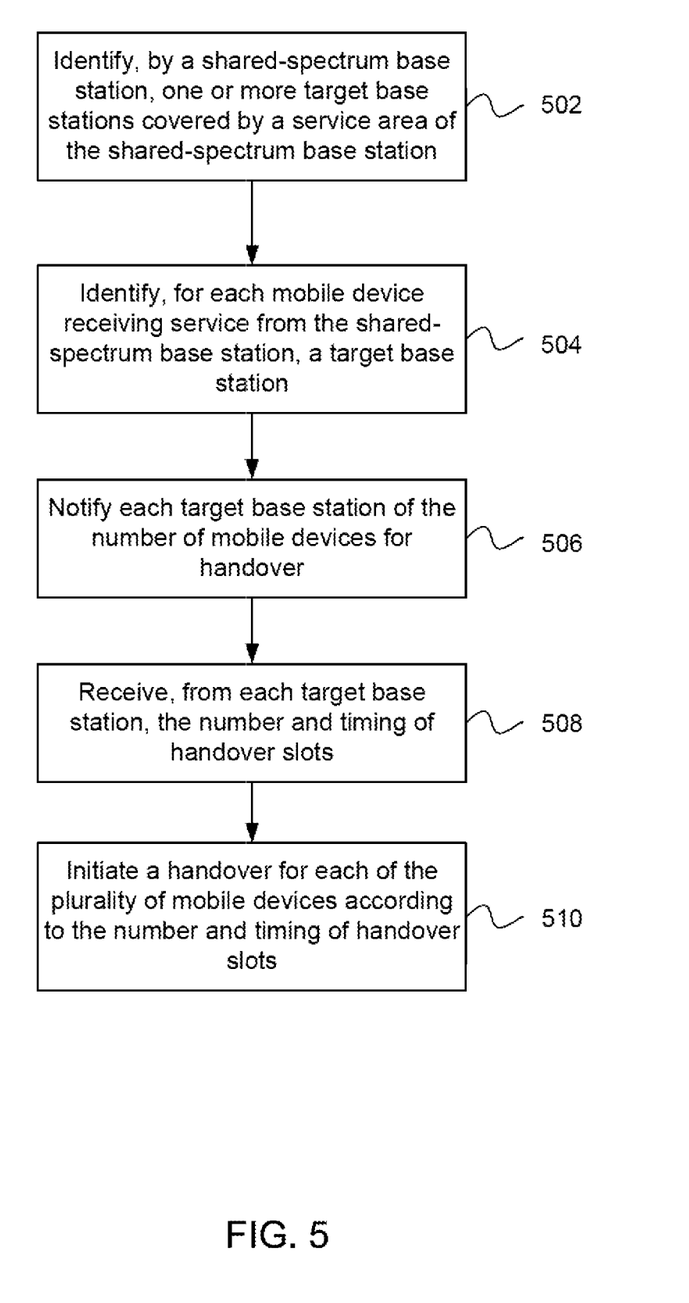
FIG. 5 is an example flow-diagram illustrating a gradual handover of mobile devices from a shared-spectrum base station to one or more target base stations.

FIG. 5 is an example flow-diagram illustrating a gradual handover of mobile devices from a shared-spectrum base station to one or more target base stations. At 502 a shared-spectrum base station identifies one or more target base stations covered by a service area of the shared-spectrum base station. In some embodiments, the shared-spectrum base station may be in communication with a backbone network and receive an indication of the target base stations within the coverage area of the shared-spectrum base station.

At 504, the shared-spectrum base station identifies a target base station for each of the mobile devices within the coverage area of the shared-spectrum base station. For example, to identify target base stations, the shared-spectrum base station may: i) identify neighboring target base stations which may be used to serve at least some of the concerned mobile devices—typically, parameters are taken into account such as geographic distance between concerned mobile devices and the target base station, load of the concerned target base station, etc.; ii) identify the currently used spectrum by the concerned target base stations; iii) if currently allocated capacity is insufficient, the target base stations may increase capacity, for example (in a 3GPP LTE system) by increasing LTE bandwidth or by re-allocating resources (for example reduce QoS to currently served users from guaranteed QoS to best effort service provision or similar); and iv) allocate available LTE resources to user devices.

At 506, the shared-spectrum base station notifies each of the target base stations of the number of mobile devices for handover from the shared-spectrum base station. In some embodiments, a central controller of the shared-spectrum network may notify each of the target base stations of the number of mobile devices for handover from one or more shared-spectrum base stations.

At 508, the shared-spectrum base station receives, from each target base station, the number and timing of handover slots for the mobile devices identified for handover. In various embodiments, handover slots are orthogonal to one another such that the target base stations are not overloaded with a large number of handover requests at one time. In some embodiments, a backbone network element may determine the number and timing of handover slots and provide them to the shared-spectrum base stations. For example, in one embodiment shared spectrum controller may select a subset of mobile devices for handover during a given time interval. In another embodiment, the each mobile device may be randomly assigned a particular wait time such that an instantaneous handover of all users is avoided.

At 510, the shared-spectrum base station initiates a handover for each mobile device from the shared-spectrum base station to a corresponding target base station.

It should be noted that a typical handover duration can be in the 100 seconds to 600 seconds range, for example. Based on LTE self-organizing network features, particularly in Automatic Neighbor Relations (ANR) this duration can be reduced to a value that may be between 0 seconds and 400 seconds. Due to this possibly long duration, handover triggers for distinct mobile devices may be issued without waiting for finalization of a previously triggered handover (i.e., overlapping handovers are possible).

As described above with reference to FIG. 2, in various implementations it is expected that a shared-spectrum allocation granted to cellular operators using shared-spectrum bands (e.g., LSA, ASA, CSS, or the like) will expire at some point. In many cases, a cellular operator may request or negotiate an extension of the shared-spectrum allocation after the expiration of a license period. In some embodiments, shared-spectrum bands may be re-allocated to cellular operators based on the requests and/or negotiations. However, the cellular operators may have access to the shared-spectrum bands under modified parameters. For example, the carrier frequency and the granted bandwidth may vary from a previous allocation.

In one embodiment, a single operator system, for example, a two step process may be employed to transition the mobile devices from the first allocation to the second allocation. In a first step, the mobile devices associated with the shared-spectrum base station may transition to one or more target base stations. In one embodiment, the transition from the shared-spectrum base station to the one or more target base stations may follow the gradual handover process discussed above with reference to FIG. 5. However, other handover procedures are contemplated as well.

In a second step, the target base station may trigger a handover for the mobile devices to the shared-spectrum base station under the second allocation. In one embodiment, the handover for each of the mobile devices may be triggered sequentially, similar to the process described above with reference to FIG. 5, in order to avoid saturation of the shared-spectrum base station. Alternatively, handover of the mobile devices could be scheduled according to service policies of the cellular operator and/or service plan of a user of the mobile device. The target base station may also take into account factors such as network congestion, priority access, and the like when making handover decisions.

While the above example may apply for a single operator system, in practice it is likely that several cellular operators are affected by the shared-spectrum relicensing/re-negotiation. To avoid potential conflict where operators may attempt to access the same spectrum after the relicensing or re-negotiation, causing network failure for the concerned shared-spectrum band, a central control entity may be used to coordinate the handover of mobile devices. In one embodiment, the controller of the shared-spectrum system, as described above in FIG. 1, may function as the central control entity. In other embodiments, an entity separate from the shared-spectrum system or a distributed function in the network architecture may function as the central controller.

Figure 6:
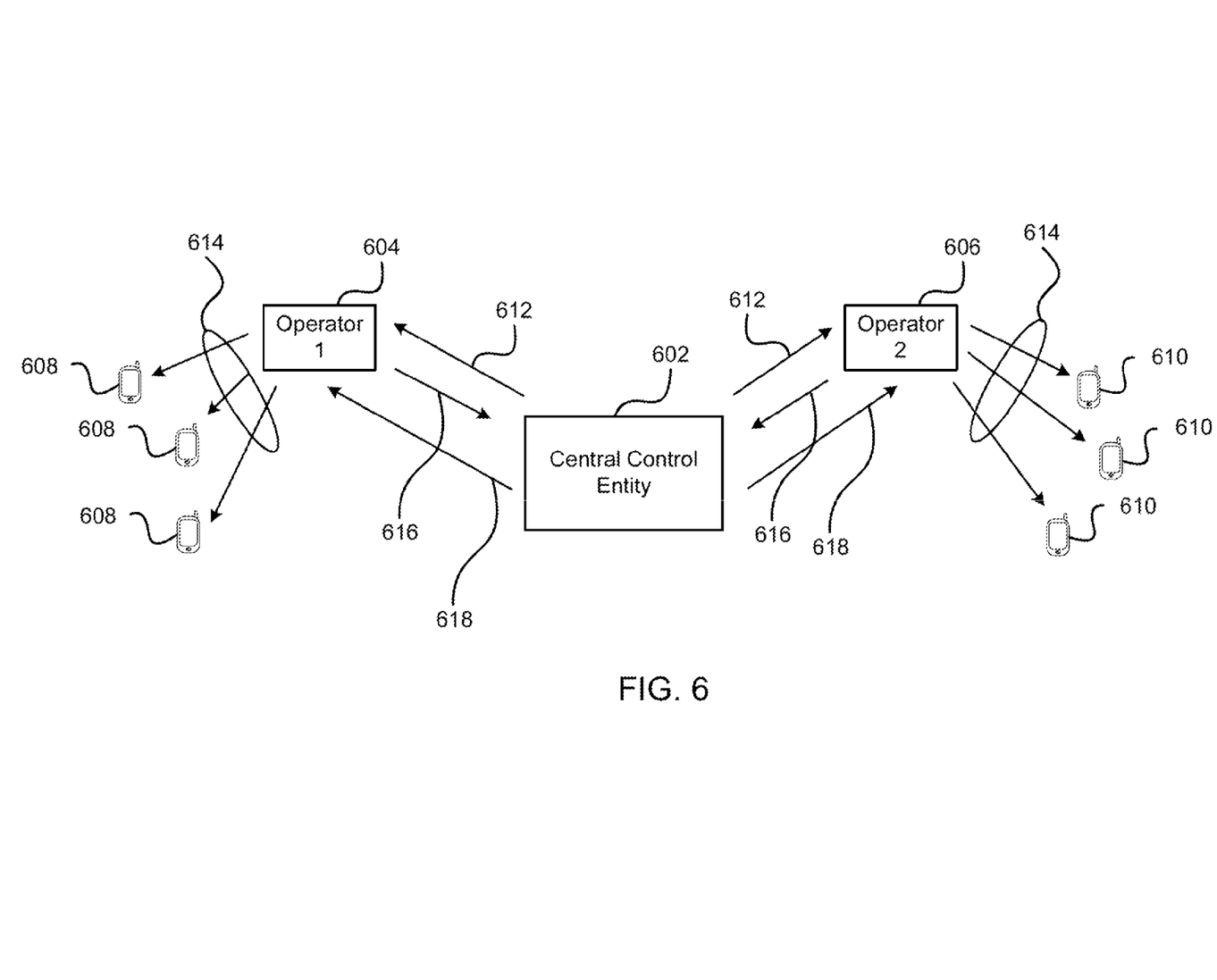
FIG. 6 illustrates a transition from a first shared-spectrum allocation to a second shared-spectrum allocation under control of a central control entity.

FIG. 6 illustrates a transition from a first shared-spectrum allocation to a second shared-spectrum allocation under control of a central control entity. In the example of FIG. 6, the central control entity 602 is in communication with cellular operators 604 and 606. Mobile devices 608 are associated with operator 604 and mobile devices 610 are associated with operator 606. The central control entity 602 indicates expiration of a first allocation period to the operators 604 and 606 using trigger 612. Using communication channels 614, the operators 604 and 606 may initiate a handover of the mobile devices 608 and 610 from a shared-spectrum base station to a target base station.

After successful handover of the mobile devices 608 and 610, the operators may acknowledge 616 to the central control entity that the mobile devices have been transitioned from the shared-spectrum base station to a target base station. In response to the acknowledgement from the operators 604 and 606, the central control entity 602 may indicate 618 to the operators that newly allocated shared-spectrum bands are available. The operators 604 and 606 may then trigger a handover, using channels 614, back to the shared-spectrum base station based on the new allocation.

Figure 7:
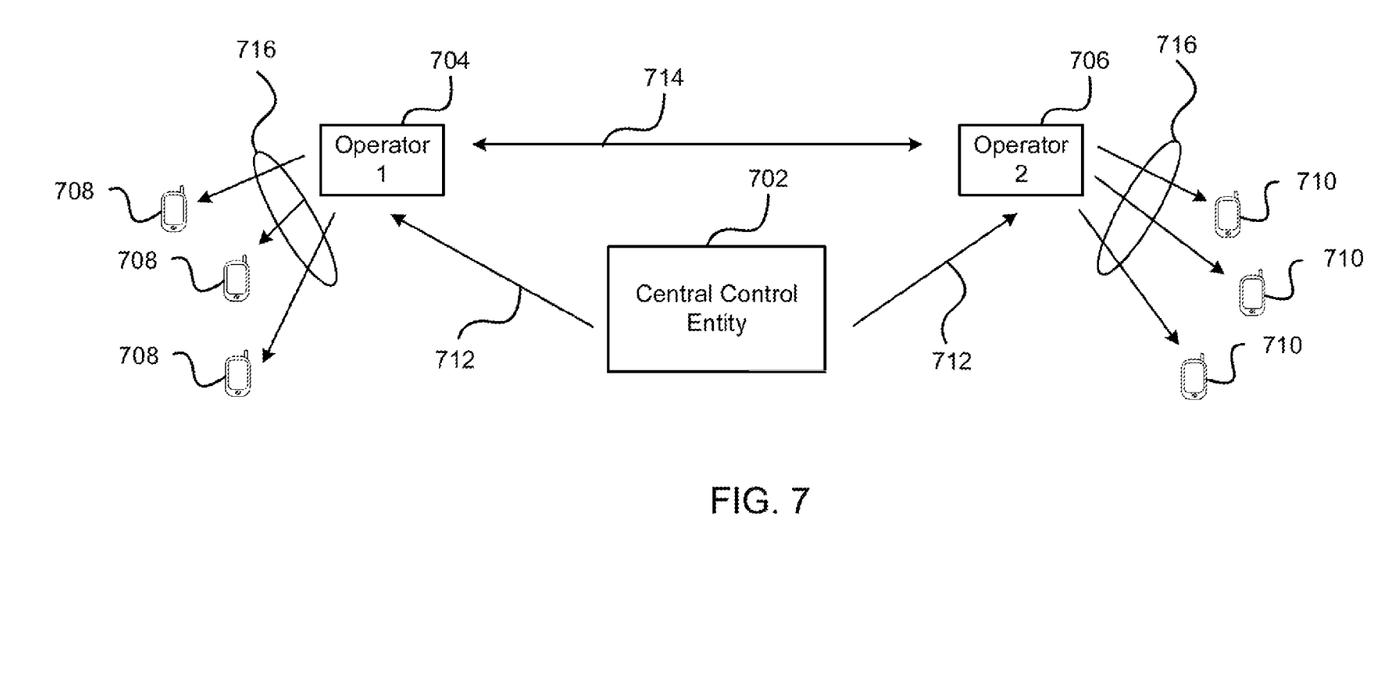
FIG. 7 illustrates a transition from a first shared-spectrum allocation to a second shared-spectrum allocation under control of a central control entity.

In another embodiment, depicted in FIG. 7, the central control entity 702 indicates to the operators 704 and 706 with trigger 712, that a first allocation period has expired. The trigger may also include other information, such as the availability of newly allocated shared-spectrum bands. After receiving this information, the operators 704 and 706 may coordinate handovers to the newly allocated shared-spectrum by communicating to the other operators when mobile devices 708 and 710 have been transitioned to a target base station.

It should be noted that the triggers and signals depicted in FIGS. 6 and 7 do not have to happen at the same time, but they are concerning the same shared-spectrum band with potential of overlap in time of use of the band between the two operators.

In some embodiments, a direct handover from one shared-spectrum allocation to a second shared-spectrum allocation may take place without transitioning mobile devices to a target base station. During the switch-over time between the two allocation periods (if such a switch-over time exists or is of a notable duration) the service provided by the shared-spectrum base station may be paused (i.e., services may be interrupted, but the connection is maintained).

Similar to the techniques described above, a gradual transition from the first allocation to a new allocation may be used to reduce interruption of service. The process may include synchronization of distinct operators similar to the techniques described above with reference to FIGS. 6 and 7.

It is anticipated that shared-spectrum licenses may be allocated to a number (typically greater than two) of operators. The corresponding handovers bridging two consecutive shared-spectrum allocation periods may serve a number of operators simultaneously. The techniques introduced above are indeed suitable to any number of operators. In practice, however, such a simultaneous transition may involve a complex synchronization between all involved operators.

Therefore, in one embodiment, a operators may perform the transition to the newly allocated shared-spectrum bands sequentially.

Figure 8:
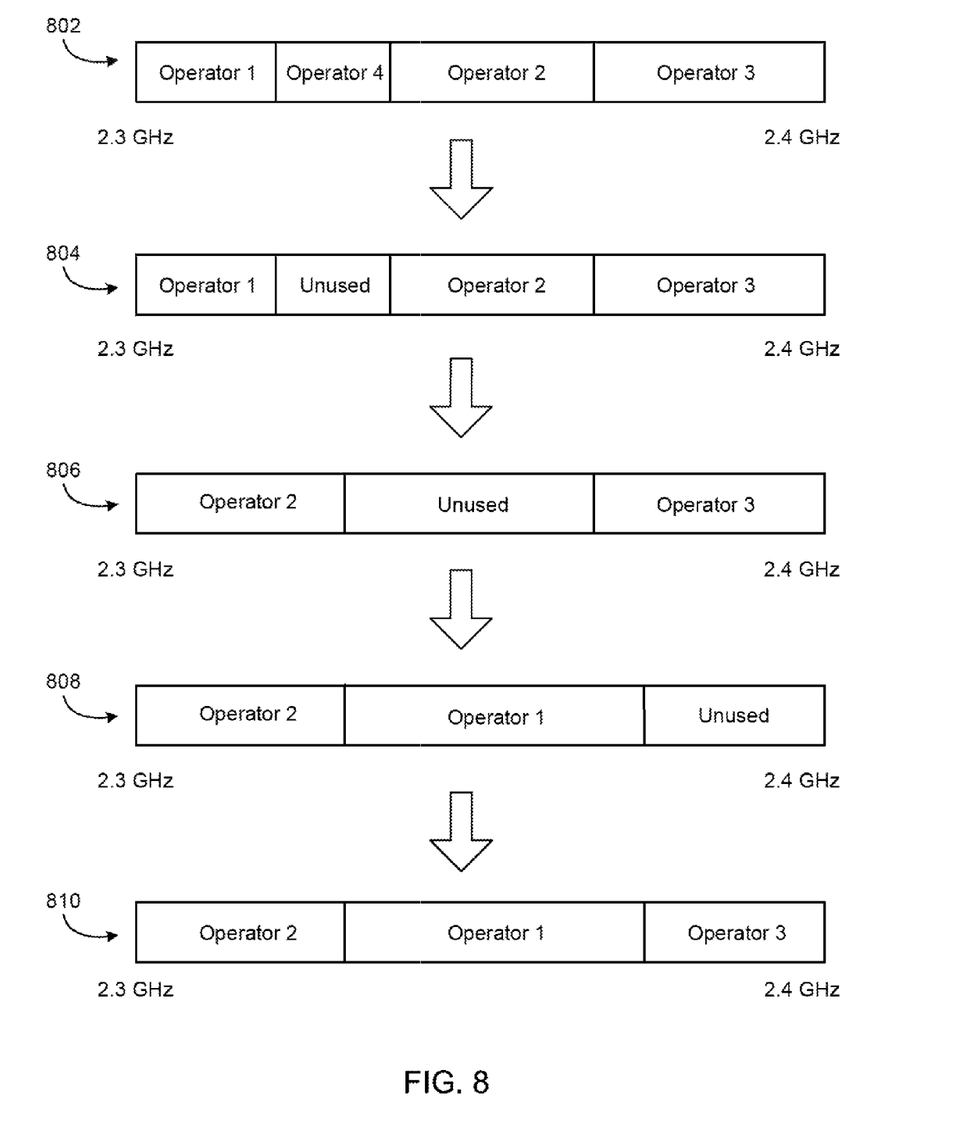
FIG. 8 illustrates a gradual transition from a first shared-spectrum allocation to a second shared-spectrum allocation for multiple operators.

FIG. 8 illustrates a gradual transition from a first shared-spectrum allocation to a second shared-spectrum allocation for multiple operators. In some embodiments, prior to the gradual transition as described in FIG. 8, each operator may play its users on hold to allow for the transition from one portion of the shared-spectrum band to another. While the example of FIG. 8 shows the transition of four operators, it is understood that any number of operators may be involved in the transition from the first shared-spectrum allocation to the second shared-spectrum allocation.

At time 802, the first shared-spectrum allocation is depicted with operators 1-4 each being allocated a portion of the shared-spectrum band.

Since operator 4, in the example of FIG. 8, does not have a portion of the second shared-spectrum allocation, at time 804, operator 4 initiates a handover from the shared-spectrum base station to a licensed band base station.

At time 806, operator 1 releases its portion of the spectrum and operator 2 assumes its portion of the spectrum according to the second shared-spectrum allocation.

At time 808, operator 3 releases its portion of the spectrum and operator 1 assumes its portion of the spectrum according to the second shared-spectrum allocation.

At time 810, operator 3 assumes its portion of the spectrum according to the second shared-spectrum allocation.

In the example of FIG. 8, it is understood that that there may be a challenge for operator 3 while being forced to stay on hold through the entire transition, as there could be a significant time lapse between time 802 and 810. There is indeed the danger that there may be interruption of services to the users connected to operator 3's network. For this reason, in some embodiments, operator 3 may also transition its users to its licensed-band spectrum during the transition.

Figure 9:
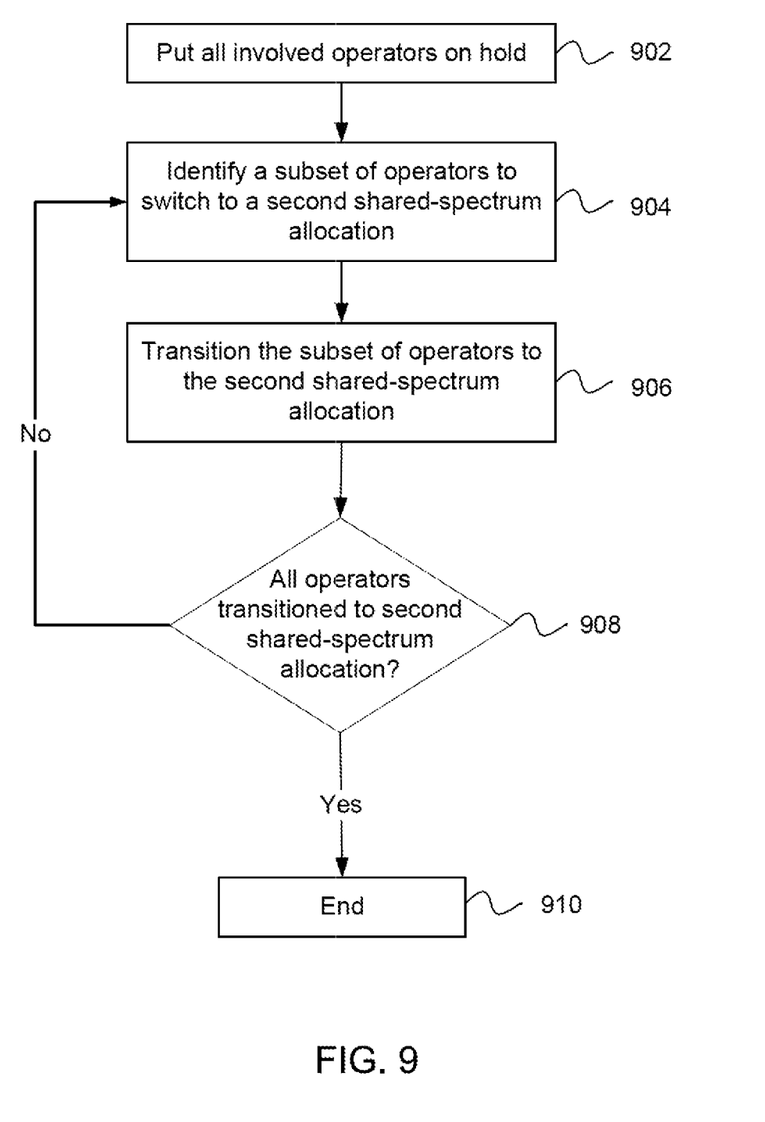
FIG. 9 is an example flow-diagram illustrating a gradual handover of mobile devices from a first shared-spectrum allocation to a second shared-spectrum allocation.

The process can be summarized as shown in FIG. 9. At 902, the shared-spectrum base station puts all involved operators on hold (i.e., the corresponding services are paused, but not disconnected). At 904, the shared-spectrum base station identifies a subset of operators that may switch to a second shared-spectrum allocation.

At 906, the shared-spectrum base station transitions the subset of operators to the second shared-spectrum allocation and reactivates the service for the concerned operators.

At 908, the shared-spectrum base station determines whether all operators have been transitioned to the second shared-spectrum allocation. If not, the process returns to 904 for additional operators to be transitioned to the second shared-spectrum allocation. If yes, the process ends at 910.

It is understood that the pause between when the services are paused and resumed is small or negligible. If the pause is longer than it is acceptable to pause service to users (e.g., according to an operators quality of service), then the shared-spectrum base station may initiate a handover to the operators' licensed-band base station while the transition occurs.

Figure 10:
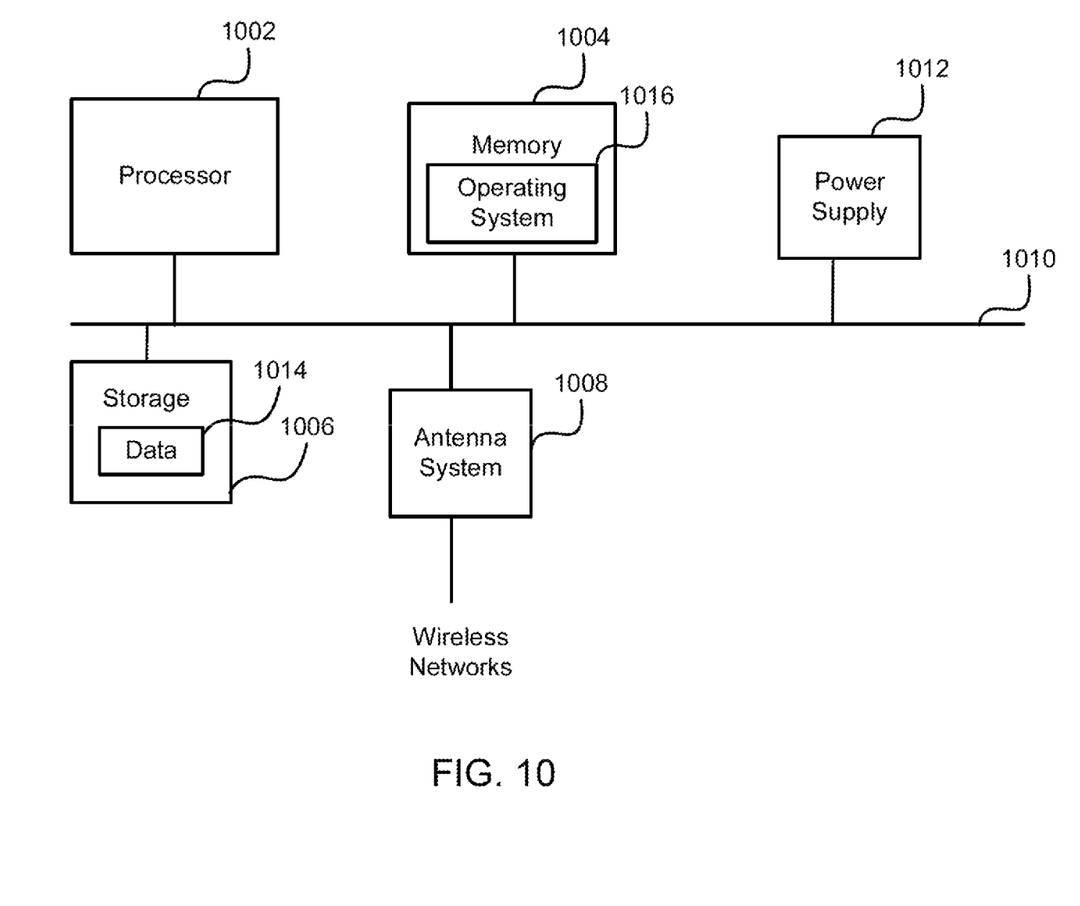
FIG. 10 is a high-level block diagram showing an example of the architecture of a base station.

FIG. 10 is a high-level block diagram showing an example of the architecture of a base station, for example a shared-spectrum base station or a target base station. In the illustrated embodiment, the base station architecture is a processing system that includes a processor subsystem 1002 that can include one or more processors. The base station architecture further includes a memory 1004, a storage module 1006, and an antenna system 1008, each interconnected by an interconnect 1010 and powered by a power supply 1012.

The base station architecture can be embodied as a single- or multi-processor system that preferably implements a high-level module to send and receive data to and from a mobile device. The data may be communicated via the antenna system 1008, which can include a single antenna or multiple antenna system capable of receiving and transmitting data on one or more frequencies. The data 1014 can be stored in the storage module 1006 so that it can be retrieved by the processor subsystem 1002 and memory 1004.

The memory 1004 illustratively comprises storage locations that can be addressed by the processor subsystem 1002 and the base station architecture's other components for storing software program code and data structures. The processor subsystem 1002 and the associated components may, in turn, include processing elements and/or logic circuitry configured to execute the software code and manipulate the data structures. The operating system 1016, portions of which are typically resident in memory 1004 and executed by the processor subsystem 1002, functionally organizes the base station architecture. It will be apparent to those skilled in the art that other processing and memory implementations, including various computer readable storage media, may be used for storing and executing program instructions pertaining to the technique introduced herein.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced herein may be stored on a machine-readable storage medium and may be executed by one or more general-purpose or special-purpose programmable microprocessors. A "machine-readable medium," as the term is used herein, includes any mechanism that can store information in a form that is accessible by a machine (a machine may be, for example, a computer, network device, cellular phone, PDA, manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic," as used herein, can include, for example, special-purpose hardwired circuitry, software and/or firmware in conjunction with programmable circuitry, or a combination thereof.

Although the present disclosure includes reference to specific example embodiments, it will be recognized that the claims are not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A shared-spectrum base station comprising:
   a processor; and
   a memory coupled with the processor, the memory storing instructions that when executed cause the shared-spectrum base station to:
      determine that a renewed license for a shared-spectrum band used by the shared-spectrum base station has been modified from a prior license, the renewed license including one or more modified parameters;
      identify one or more target systems covered by a service area of the shared-spectrum base station;
      identify, for each mobile device in communication with the shared-spectrum base station, a particular target system of the one or more target systems and a number and timing of handover slots based at least in part on the one or more modified parameters, wherein the number of handover slots corresponds to the number of mobile devices for handover; and
      initiate a handover for each of the plurality of mobile devices to the one or more target systems according to the number and timing of handover slots to avoid overload of the one or more target systems with handover requests at one time.

2. The shared-spectrum base station of claim 1, wherein the instructions further cause the shared-spectrum base station to:
   notify each target system of the number of mobile devices for handover; and
   receive from each target system, the number and timing of handover slots.

3. The shared-spectrum base station of claim 1, wherein the instructions further cause the shared-spectrum base station to:
   receive a handover for each of a second plurality of mobile devices according to the availability of newly allocated or re-negotiated shared-spectrum bands.

4. The shared-spectrum base station of claim 1, wherein the instructions further cause the shared-spectrum base station to:
   receive a handover of mobile devices associated with a plurality of licensed-band operators, wherein the handover for each of the plurality of licensed-band operators takes place sequentially.

5. The shared-spectrum base station of claim 1, wherein the shared-spectrum band is a low frequency band relative to the target band and the service area of the shared-spectrum base station covers service areas of multiple target base stations.

6. The shared-spectrum base station of claim 1, wherein the service area of the shared-spectrum base station overlaps at least a portion of a coverage area of a target base station.

7. The shared-spectrum base station of claim 1, wherein the shared-spectrum band is a high frequency band relative to the target band and the service area of multiple shared-spectrum base stations fall within a service area of a single target base station.

8. The shared-spectrum base station of claim 1, wherein to initiate a handover for each of the plurality of mobile devices according to the number and timing of handover slots, the instructions cause the shared-spectrum base station to initiate a handover for a next handover slot prior to finalization of a previously triggered handover.

9. The shared-spectrum base station of claim 1, wherein the handover slot is for one mobile device.

10. The shared-spectrum base station of claim 1, wherein the handover slot is for more than one mobile device.

11. The shared-spectrum base station of claim 1, wherein the target base station is a long term evolution (LTE) base station.

12. The shared-spectrum base station of claim 1, wherein the shared-spectrum base station is a licensed shared access (LSA) base station.

13. The shared-spectrum base station of claim 1, wherein the shared-spectrum base station is an authorized shared access (ASA) base station.

14. The shared-spectrum base station of claim 1, wherein the shared-spectrum base station is a cloud spectrum cervices (CSS) base station.

15. The shared-spectrum base station of claim 1, wherein the one or more modified parameters include an allocation period.

16. The shared-spectrum base station of claim 1, wherein the one or more modified parameters include an geographic area.

17. The shared-spectrum base station of claim 1, wherein the one or more modified parameters include carrier frequency and granted bandwidth.

18. A method for transitioning a plurality of mobile devices from a first allocation of shared-spectrum bands to a second allocation of shared-spectrum bands provided by one or more shared-spectrum base stations through use of a target band provided by a target base station, the method comprising:

receiving an indication, at a target base station, to begin a handover for each of the plurality of mobile devices from one or more shared-spectrum base stations to the target base station during a transition from the first allocation to the second allocation, the indication based at least in part on a renewed license for a shared-spectrum band used by the one or more shared-spectrum base stations being modified from a prior license, the renewed license including one or more modified parameters, and the plurality of mobile devices indicated based at least in part on the modified parameters;

transmitting, by the target base station to each of the one or more shared-spectrum base stations, an indication of a handover slot and corresponding timing for each of the plurality of mobile devices;

performing the handover for each of the plurality of mobile devices to a target band of the target base station according to the handover slot and corresponding timing for each of the plurality of mobile devices, wherein the target band is different than the first allocation of shared-spectrum bands and the second allocation of shared-spectrum bands;

receiving, at the target base station, an indication of availability of shared-spectrum bands in the second allocation of at least one of the one or more shared-spectrum base stations; and performing a handover for mobile devices to the second allocation of shared-spectrum bands of the at least one of the one or more shared-spectrum base stations.

19. The method of claim 18, wherein the handover slot is for one mobile device.

20. The method of claim 18, wherein the handover slot is for more than one mobile device.

21. The method of claim 18, wherein the target base station is a 3rd Generation Partnership Project Long Term Evolution (3GPP LTE) base station.

22. The method of claim 18, wherein the one or more shared-spectrum base stations include a licensed shared access (LSA) base station.

23. The method of claim 18, wherein the one or more shared-spectrum base stations include an authorized shared access (ASA) base station.

24. The method of claim 18, wherein the one or more shared-spectrum base stations include a cloud spectrum cervices (CSS) base station.

* * * * *